July 13, 1965 H. B. MOORE 3,194,566

DEVICE FOR USE IN HANDLING PHONOGRAPH RECORDS

Filed June 15, 1961

INVENTOR:
HARWOOD B. MOORE,

BY Norman C. Fulmer
HIS ATTORNEY.

3,194,566
DEVICE FOR USE IN HANDLING PHONOGRAPH RECORDS

Harwood B. Moore, Sauquoit, N.Y., assignor to General Electric Company, a corporation of New York
Filed June 15, 1961, Ser. No. 117,376
7 Claims. (Cl. 274—2)

Figures 1, 2, 3, 4, 5:
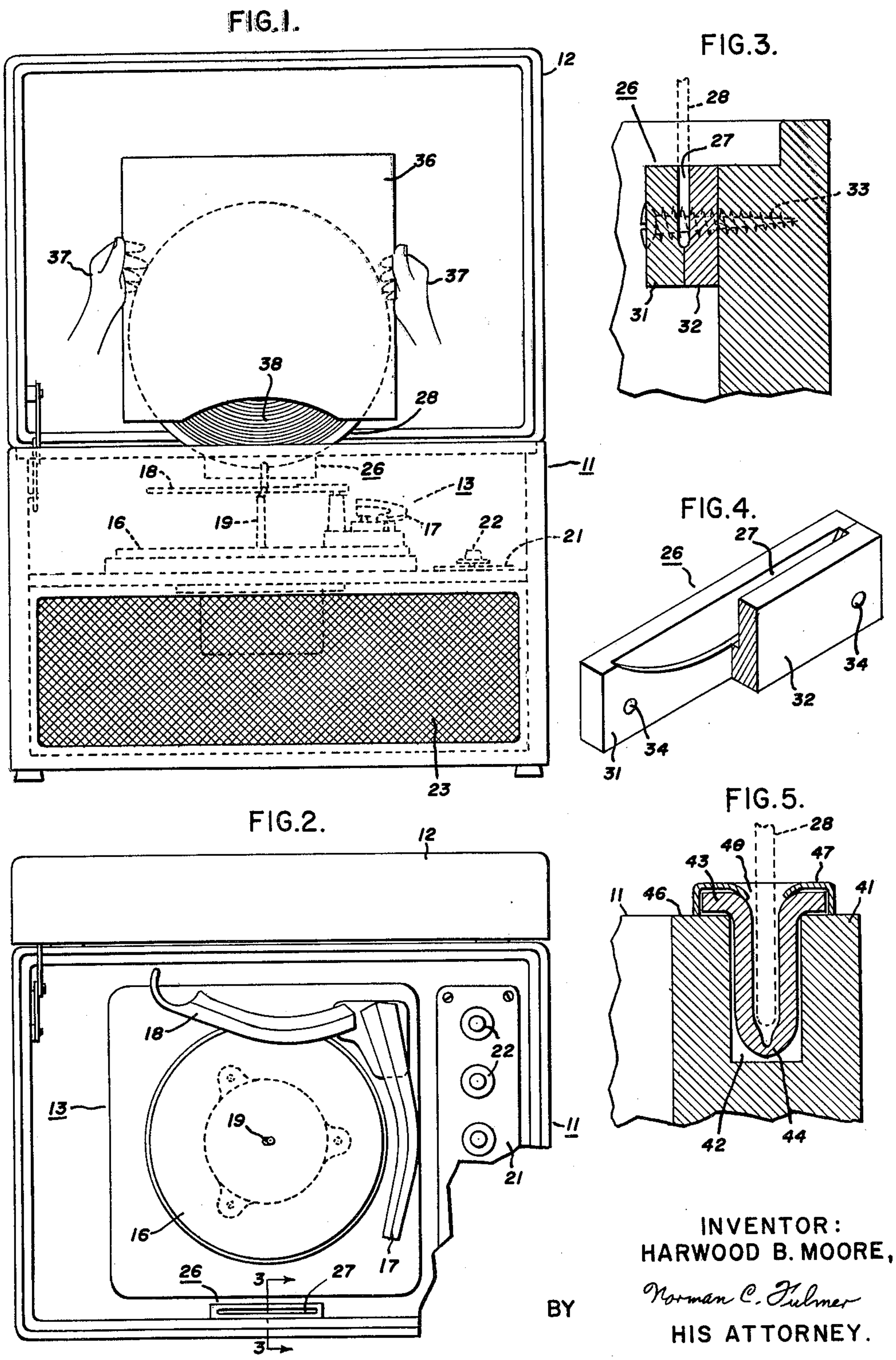

This invention relates to phonographs and phonograph records, and particularly to a device for use in handling phonograph records while being removed from or placed into record jackets or sleeves in which the records customarily are kept or stored while not being played on the phonograph.

It is desirable to keep the grooves of the phonograph records clean in order to permit long life of the records and of the phonograph playback needle, and to insure good fidelity when the records are played on phonographs. Dust, oil and grease in the record grooves are detrimental to playback fidelity and to the life of the record and needle. One cause of undesired dust and grease on record grooves is the touching of record surfaces, either accidentally or through ignorance, by the hands while removing the records from or placing them into the jackets or sleeves in which they customarily are kept. Such jackets or sleeves normally are made from paper, cardboard, or thin plastic material. It is often difficult to remove records from, or replace them into, their jackets without touching the record surface with the hands or fingers. Any such touching of the record surface not only tends to deposit some dust in the record grooves, but also leaves some oil or grease from the skin in the grooves. Subsequently, dust tends to stick to these oily and greasy marks. This undesired effect is cumulative; i.e., each time a record is played, more finger marks, and hence more dust, will accumulate in the record grooves.

An object of the invention is to keep phonograph records clean.

Another object is to provide a device for use in handling phonograph records.

A further object is to provide a device to aid in removing records from, and placing them into, their protective jackets, so that hands will not touch the record grooves.

Other objects will be apparent from the following description and claims, and from the drawing in which:

FIG. 1 is a front view of a typical phonograph, showing an embodiment of the invention, FIG. 2 is a top view of the phonograph of FIG. 1, FIG. 3 is a cross-sectional view taken on the line 3—3 of FIG. 2, FIG. 4 is a perspective view of a device in accordance with the invention, and FIG. 5 is a cross-sectional view of an alternative embodiment of the invention.

The invention, in its basic preferred form, comprises means defining a record-holding slot placed in or on a phonograph, or located in an auxiliary attachment for a phonograph, the slot being adapted to hold a phonograph record while the record is being removed from, or placed into, its jacket. Thus, the records can be handled without touching the grooves. The term "groove" as used herein denotes the continuous spiral recorded groove on a side of a disc record. Generally, there are one or more such grooves on each side of a record.

Now referring to FIGS. 1–4 of the drawing, a phonograph cabinet 11 is provided with a lid 12 shown in raised position, and contains a record player 13 which may comprise the usual turntable 16, tone arm 17, a record stabilizer bar 18 for stabilizing a stack of records if the record player 13 is of the automatic record changer type, and a spindle 19 over which phonograph records are placed for playing thereof. The phonograph further comprises amplifier apparatus 21 provided with control knobs 22, and a loudspeaker at 23.

The record player 13, or preferably the cabinet 11 containing the record player, is provided with a record handling device 26 having a slot 27 adapted to hold a phonograph record 28 in a vertical or other suitable position when the record is placed therein, as will be more fully described subsequently.

The embodiment of the invention shown in FIGS. 1–4 comprises a record-holding attachment comprising two parts 31 and 32 made from wood, plastic, metal or other suitable material, and shaped so that when placed together as shown, the slot 27 will be provided thereby. The slot 27, as shown, has a curved bottom conforming generally to the shape of the edge of a typical record. However, if desired, the slot 27 may be provided with a flat bottom. The two parts 31 and 32 are shown attached to the inside of the front panel of the cabinet 11 by means of screws 33 passing through holes 34 in the parts 31 and 32. Being at the inside of the front panel of the cabinet, the slot 27 is covered and concealed by the lid 12 when this lid is in closed position. The slot 27 preferably is only slightly wider than the thickness of average phonograph records.

The invention functions as follows. To place a record 28 on the phonograph 13, the jacket 36 containing the record is held vertically by the hands 37, with the open edge of the jacket at the bottom thereof. By holding the jacket 36 with proper pressure, the record 28 will slide downwardly and partly out of the jacket 36, whereupon the record 28 enters and is held by the slot 27. The hands 37 then loosen their grip on the sides of the jacket 36, and may press together slightly, thereby releasing the jacket 36 from the record 28, and the jacket 36 is then slid upwardly and away from the record 28. This leaves the record 28 supported in the slot 27, as yet untouched by the hands. The record 28 is then grasped at its edges, which can easily be done without touching the groove or grooves 38, and is lifted out of the slot 27 and placed on the record player 13.

To remove a record 28 from the record player 13, the above procedure is reversed. The record is picked up by its edges from the record player, and placed in the slot 27 without touching the groove 38. The jacket 36 is then picked up and slid down over the record 28. Then, by applying slight pressure of the fingers on the sides of the jacket 36, the jacket and record are picked up, thereby removing the record 28 from the slot 27. If the record 28 is not completely in its jacket 36 at this point, the jacket 36 may be turned over so that the record 28 will settle all the way therein, or the record can be pushed at its edge to move it completely into the jacket.

Thus, as described above, with the aid of the record handling device 26 of this invention, records are removed from, and placed into, their protective jackets without incurring the risk of touching the record surfaces and their grooves with the hands.

FIG. 5 shows an alternative arrangement of the invention, and is a cross-sectional view through the slot of the record-holding device similar to the view of FIG. 3. In FIG. 5, the numeral 41 indicates the front panel of a record player cabinet, or any other suitable portion of the cabinet or record player itself or other body member. A slot 42 is formed in the member 41, the slot 42 being wider than the thickness of a record. The slot 42 is lined with a liner 43 which may be a folded piece of soft material, such as felt or sponge rubber, the liner 43 being folded at the bottom 44 thereof. The upper ends of the liner 43 are bent mutually outwardly over the top surface 46 of the member 41, and are held in this position by means of an escutcheon plate 47 attached thereover and provided with a slot 48 slightly larger than the record-holding slot provided by the liner 43. The escutcheon 47 may be made from metal, plastic, or other suitable material, and the top surface thereof may be curved or tapered downwardly toward the slot 48 to facilitate placing records therein.

In the embodiments of the invention described above, the record-holding slot 27 is sufficiently narrow to hold a record 28 approximately vertical when placed therein, and is sufficiently long and deep so that a sufficient part of the record will enter the slot in order to support the record in a free-standing position when held by the slot 27. The slot may be shaped so that either the ends thereof, or the bottom thereof, or both, are engaged by the edge of the record 28 when the record is held therein. Preferably, the slot is arranged so the bottom thereof limits the insertion of smaller diameter records and the ends thereof limit the insertion of larger diameter records. Preferably the liner 43 in the embodiment of FIG. 5 is arranged such that this lining engages the record 28 sufficiently tightly to aid in holding the record, or to suitably hold the record even if it is inserted only part way into the slot 27. This facilitates removing records from tight-fitting jackets.

Suitable dimensions for the slot 27 are, for example, approximately 6 inches long and 2 inches deep. The width, or distance across the slot 27, may be such as to provide for a snug fit of the record 28 therein, or a relatively loose fit, as may be desired. As stated above, a snug fit is preferable, for aiding in removing tight-fitting record jackets. Although the slot 27 preferably is vertical, it may be inclined, if desired, either in the direction of its length or width, so long as it will hold a record in accordance with the principles of the invention.

It is important that the slot 27 be designed to contain only so much, or a little more, of the record as is necessary for securely holding the record, so that a major portion of the record is exposed for placement and removal of the jacket therein. The slot should be provided in, or attached to, a record player, or phonograph cabinet, or other suitably heavy device, or to a suitable fixed or anchored device, so the records will be suitably held in position while their jackets are removed therefrom and placed thereon. The slot 27 need not have continuous or straight sides; i.e., the sides may be partly broken away, curved outwardly, or partially omitted, so long as means are provided for defining a slot in accordance with the principles of the invention.

While preferred embodiments of the invention have been shown and described, various other embodiments and modifications thereof will be apparent to those skilled in the art, and will fall within the scope of invention as defined in the following claims.

What I claim is:

1. A device for use in handling phonograph records, comprising a body member provided with means defining a substantially vertical slot wider than the thickness of a phonograph record, a liner of soft material positioned in said slot against the sides thereof, the upper ends of said liner being positioned mutually outwardly over the top surface of said body member, and an escutcheon positioned over said upper ends of the liner and provided with a slot positioned over the slot in said body member, said lined slot being adapted to hold a record so that a major portion of the record is exposed for placement and removal of a jacket thereon.

2. A device as claimed in claim 1, in which the upper surface of said escutcheon is beveled downwardly toward said slot of the escutcheon.

3. A phonograph comprising a plurality of panel members defining an open-top housing, a record player disposed on a panel member within said housing, and a lid for covering the open top of said housing, means defining only a single substantially vertical slot attached adjacent said record player to one of said panel members at the top thereof and within said housing whereby said slot is covered by said lid when in closed position, said slot being dimensioned to receive and hold a substantially vertical record, when said lid is in open position, so that a major portion of the record is exposed adjacent the record player for placement and removal of a jacket thereon.

4. In a phonograph having means including a panel member for defining a housing for a record player, means defining a substantially vertical slot at the top of said panel member, said slot being wider than the thickness of a phonograph record, a liner of soft material positioned in said slot against the sides thereof, the upper ends of said liner being positioned mutually outwardly over the top surface of said panel member, and an escutcheon positioned over said upper ends of the liner and provided with a slot positioned over the slot in said body member, said lined slot being adapted to hold a record so that a major portion of the record is exposed for placement and and removal of a jacket thereon.

5. A phonograph comprising an inclosable housing, a base member disposed in said housing a record playing device disposed on said base member, and means including only a single non-horizontal slot located in said base member adjacent said record player device for helping to protect disc-type records during the handling of said records in conjunction with said device, said slot being dimensioned to receive a minor portion of a single non-horizontally disposed disc-shaped record thereby to at least partially support and hold said record, said slot receiving said record with a major portion of said record being exposed from said slot thereby to expose a substantial portion of said record adjacent said record player device to facilitate the placement and removal of a protective jacket relative to said record.

6. A phonograph comprising an enclosable housing, a base member disposed in said housing, a record player disposed on said base member, and means associated with said record player for use in handling phonograph records with respect thereto, said means comprising only a single substantially vertical slot means located in said base member adjacent said record player, said slot means being dimensionally adapted to cooperate with, retain and support a substantially vertical record, said slot means receiving said record with a major portion of the record extending upwardly and outwardly from said slot, thereby to expose a substantial portion of said record adjacent said record player for placement and removal of a protective jacket relative to said record.

7. The phonograph of claim 6 wherein said slot means has a depth dimensioned to limit the insertion of smaller diameter records therein, and has a length dimensioned to limit the insertion of larger diameter records therein.

References Cited by the Examiner

UNITED STATES PATENTS

| | | | |
|---|---|---|---|
| 638,785 | 12/99 | Whittlesey | 211—40 X |
| 1,310,814 | 7/19 | Ward | 312—10 |
| 1,420,004 | 6/22 | Weide | 211—40 X |
| 2,475,744 | 6/49 | Horman | 274—2 X |
| 2,500,773 | 3/50 | Robins | 312—10 |
| 2,557,031 | 6/51 | Isbenjian | 274—1 |

NORTON ANSHER, *Primary Examiner.*

JOHN P. WILDMAN, EVON C. BLUNK, *Examiners.*